July 30, 1957 H. FISCHER 2,800,813
METHOD AND APPARATUS FOR THE PLASTIC SHAPING OF METALS
Filed March 31, 1953 9 Sheets-Sheet 1

INVENTOR
HANS FISCHER
ATTORNEYS

July 30, 1957 H. FISCHER 2,800,813
METHOD AND APPARATUS FOR THE PLASTIC SHAPING OF METALS
Filed March 31, 1953 9 Sheets-Sheet 5

INVENTOR
HANS FISCHER

ATTORNEYS

July 30, 1957  H. FISCHER  2,800,813
METHOD AND APPARATUS FOR THE PLASTIC SHAPING OF METALS
Filed March 31, 1953  9 Sheets-Sheet 7

INVENTOR
HANS FISCHER
BY
ATTORNEYS

July 30, 1957 H. FISCHER 2,800,813
METHOD AND APPARATUS FOR THE PLASTIC SHAPING OF METALS
Filed March 31, 1953 9 Sheets-Sheet 8

INVENTOR
HANS FISCHER
BY
ATTORNEYS

July 30, 1957          H. FISCHER          2,800,813

METHOD AND APPARATUS FOR THE PLASTIC SHAPING OF METALS

Filed March 31, 1953          9 Sheets-Sheet 9

INVENTOR
HANS FISCHER

ATTORNEYS

United States Patent Office 2,800,813
Patented July 30, 1957

2,800,813

METHOD AND APPARATUS FOR THE PLASTIC SHAPING OF METALS

Hans Fischer, Nurnberg, Germany, assignor to Kabel- und Metallwerke Neumeyer Aktiengesellschaft, Nurnberg, Germany Application March 31, 1953, Serial No. 345,916

Claims priority, application Germany April 10, 1952

15 Claims. (Cl. 78—9)

This invention relates to the art of metal working.

The invention particularly relates to an apparatus for the plastic shaping of metals.

More specifically the invention relates to apparatus for drawing or pressing metals constituting a departure from known drawing or pressing operations with reference to the mobility of and capacity of punch and matrix members. Still more specifically the invention relates to a metal shaping press embodying a concept constituting a departure from known presses.

Specifically as regards the apparatus, the invention relates to a press in which the metal to be shaped is worked upon by a die including movable punch and matrix members which are movable toward and away from one another.

Still more specifically the invention relates to a drive for a metal working press.

From a comprehensive standpoint the invention relates to a press structure for the plastic shaping of metal, starting from a relatively thick section of metal such as a round disk, a cylindrical portion such as a wire or rod length or a prepressed metal body which by drawing, re-drawing, ironing, pressing, or extrusion, can be shaped into bodies of desired formation, preferably shaped into hollow bodies.

To effect plastic working of metal of this character, in a manner in which no blank holders are needed, it is known to use single acting presses which operate in a more or less simple manner in which one tool, generally the matrix, is secured to what can be termed a press table that is in effect rigidly connected with the press while the other tool, for example the press punch, is secured to a press ram and moves with the ram to effect the entire operation or stroke of the press.

The pressing operation, in connection with an effective stroke on a vertical axis, includes the downward motion of the ram during which the tool carried by the ram and the matrix approach one another and a return stroke during which they move apart. When the respective tools, die and matrix, are at a maximum distance from one another the workpiece or blank or slug to be shaped is inserted between the tools and thence one tool, for example the ram, approaches the matrix substantially without the expenditure of force until the matrix, punch and workpiece are forcibly engaged. Then the working stroke proper occurs, that is the shaping of the workpiece by the application of force during the remaining portion of the press operation or stroke, until the end position of the punch is reached. During the return motion of the ram the shaped workpiece is released from the tools, that is either stripped off from the punch or pushed out from the matrix which requires an application of a comparatively small force in comparison to that required for shaping the workpiece.

The entire stroke of the press, which determines the total length of the workpiece to be shaped, as well as that part of the stroke constituting the working or shaping stroke, during which pressing force is to be applied and pressing work done, substantially determine the constructional cost or expenditure for a press. On the other hand the efficiency of the press, that is the number of pieces or production rate, is determined by the admissible maximum operating speed of the tool or punch allowable at the moment of the forceful engagement between tool, workpiece and matrix.

The present invention has for an object to provide a press for shaping metal, particularly for the formation of hollow bodies, from solid blanks or preshaped or predrawn cup-shaped blanks which provides for more economical press structure in comparison with the cost of prior known presses and a press structure which simultaneously embodies increased efficiency, that is the number of workpieces or production rate, is increased.

It is a further object to provide a mechanism for producing hollow bodies from a solid blank or slug or a cup blank which engages the blank between oppositely movable matrix and punch members and maintains the matrix stationary while the punch performs the working stroke and then simultaneously moves punch and matrix apart to permit release of the workpiece and insertion of another.

It is a more specific object to provide a metal working press particularly for the formation of hollow bodies including oppositely movable slides with which are respectively embodied a matrix and a punch and drive means for the slides effective to move them toward one another and impart in the stroke of one of these members a dwell or stationary position while the other slide continues its movement to constitute a working stroke and when the working stroke is completed the drive means moves the respective slides apart.

It is a further specific object to provide a drive construction that includes hydraulic means for effecting and for controlling the stroke of one of the members.

According to the invention both tools, namely the punch and the matrix, are movably mounted so that one tool, the punch which is carried by a movable slide, executes a stroke movement which corresponds to the required working stroke while the other tool, namely the matrix, is held in a stationary position near the punch and upon completion of the work stroke both punch and matrix move away from each other to increase the distance between punch and matrix to such an extent that the shaped workpiece is released from the tools and a new workpiece may be inserted in the position in alignment with the axis of the tools.

Further and more specific objects will be apparent from the following description taken in connection with the accompanying drawings illustrating the method of shaping metals from solid or preformed blanks, particularly the method of shaping hollow bodies, and the press for effecting the method and its manner of operation and in which.

Figures 1, 2, 3:
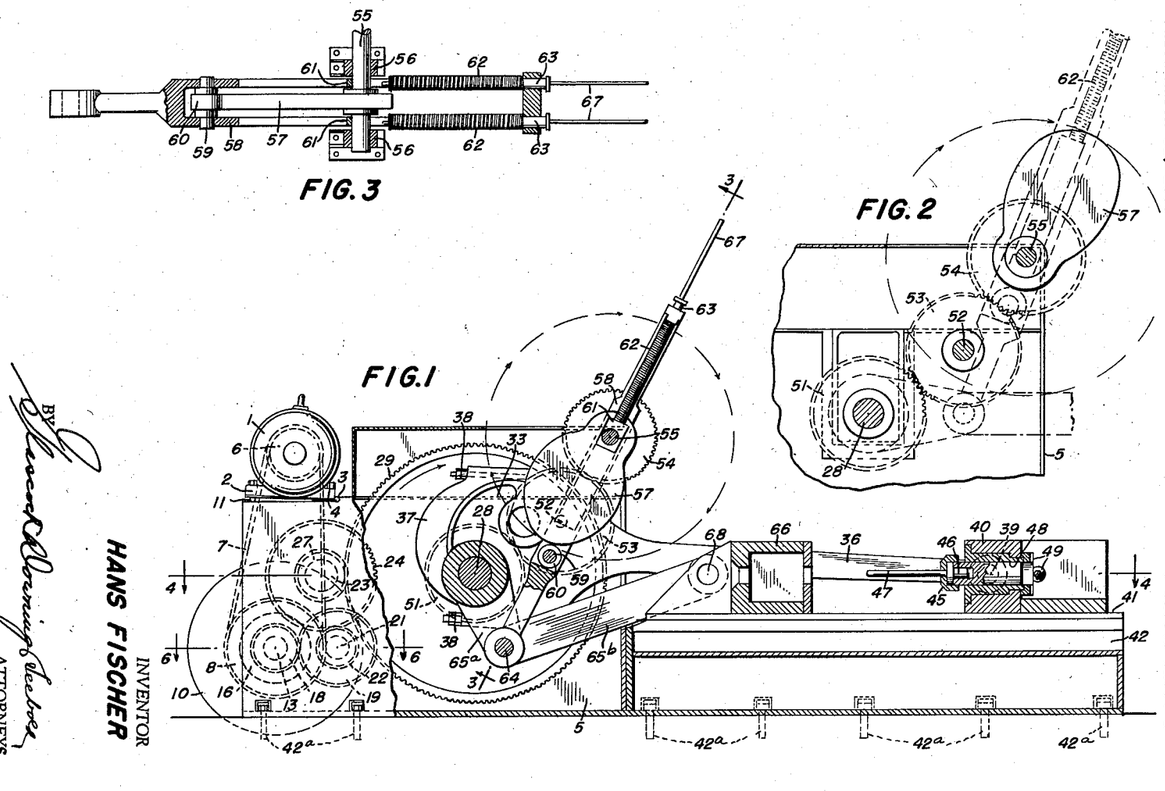
Figure 1 illustrates partly in side elevation and partly in section a double acting combined eccentric and toggle linkage press with a horizontal working axis.
Figure 2 is a fragmentary view illustrating the drive for the cam disk for operating the linkage constituting the drive for one of the tool slides.
Figure 3 is a view taken along lines 3—3 of Figure 1 illustrating the means for moving and controlling the linkage with certain parts in elevation.
Figures 4, 5, 6:
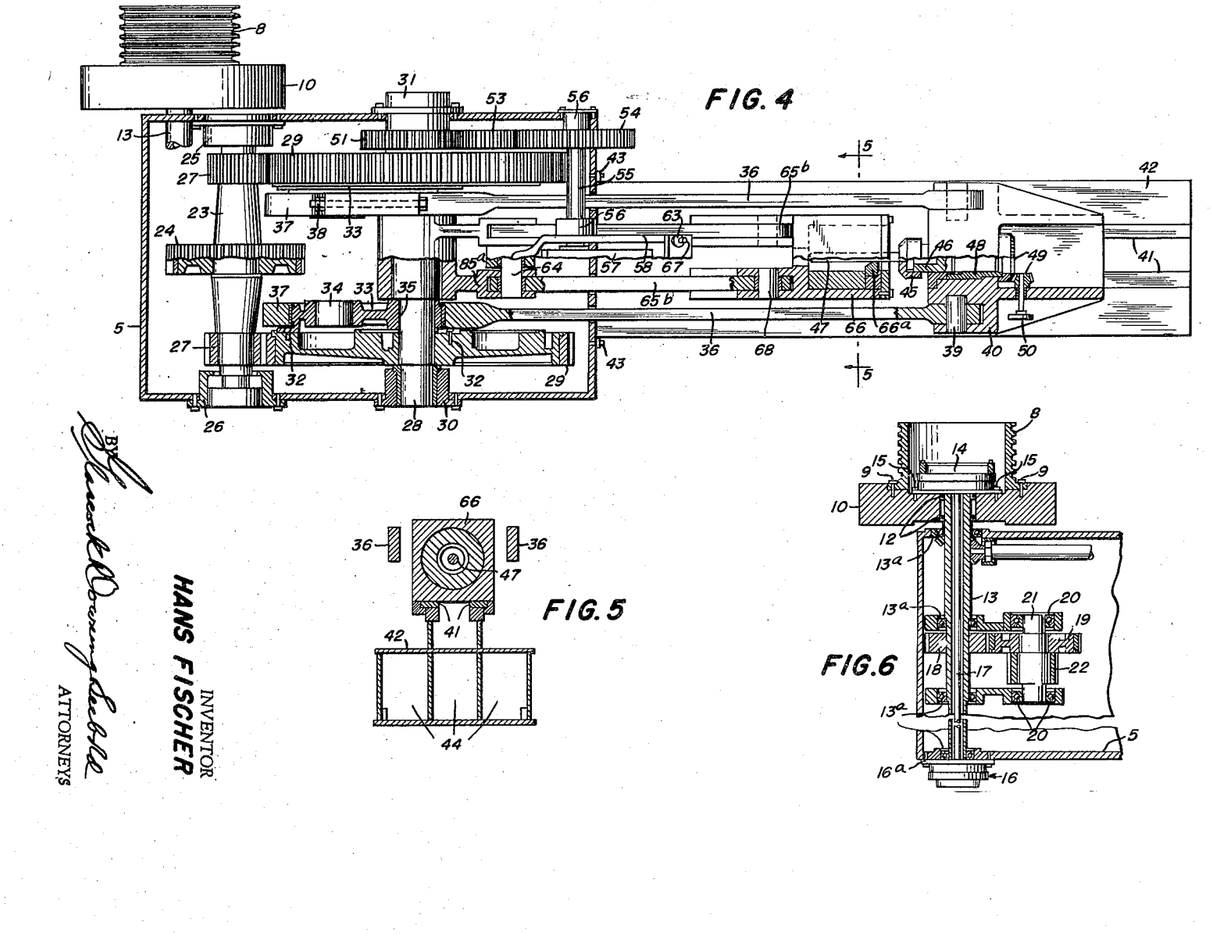
Figure 4 is a top view partly in plan and with parts removed and partly in section along lines 4—4 of Figure 1 with the slides in a different position, that is moved closer to one another.
Figure 5 is a sectional view taken along lines 5—5 of Figure 4 illustrating the machine bed and the slide guides.
Figure 6 is a horizontal sectional view taken on lines 6—6 of Figure 1 and illustrating the input drive shaft and the first countershaft.

In the drawings with particular reference to Figures 1 and 4, the drive for the press is constituted by an electric motor 1, the base of which is fastened by screws or bolts 4 to the plate 2 which in turn is pivotally mounted at 3 to the top or upper side of the drive housing 5. On the stub shaft of the motor 1 is keyed a pulley 6. This pulley drives by a V-belt 7 a pulley 8 which in turn is fastened by means of bolts or screws 9 to a flywheen 10. The tensioning of belt 7 is effected by tightening bolt or screw 11 against the top of the housing 5 whereby the electric motor 1 and plate 2 are swung about pivot 3.

As shown in Figure 6, the flywheel 10 is journaled by means of ball bearings 12 for rotation about hollow shaft 13. A control clutch 14 is provided to couple or uncouple the hollow shaft 13 with the flywheel 10. The outer element of the control clutch is fastened by screws 15 to the flywheel and the inner element is splined by means of a wedge or key to hollow shaft 13. The clutch 14 is connected with a brake 16 on the opposite side of the drive housing by means of a rod 17 that passes through the bore of hollow shaft 13 and this connection between clutch and brake is such that when the clutch 14 is thrown in the brake 16 is released and when the clutch is thrown out the brake is applied whereby the driving mechanism of the press is stopped while the flywheel can continue to rotate.

In connection with the brake and clutch mechanism illustrated in Figure 6, the details of construction thereof include for the clutch, disks mounted internally of the outer element that is fastened to the flywheel and further disks mounted internally of the inner element, that is fastened to hollow shaft 13. Within the inner element is a piston movable in a path in alignment with the axis of shaft 13 and a suitable air hose is coupled with the inner element along the axis thereof in a manner which permits the clutch elements to rotate relative to the air hose coupling which insures admission of air to the piston so as to apply the disks against one another to couple the inner element of the clutch to the flywheel so that the rotation of the flywheel imparts the drive to the gear mechanism within housing 5 with sufficient impetus when clutched to insure proper movement of the slides. Simultaneously with the movement of the piston in the inner element of the clutch, the rod 17 moves axially within the hollow shaft 13 to effect release of the brake. The brake 16 includes one member coupled to the hollow drive shaft and constituting the inner member and an outer member 16a fastened by a flange connection to the housing 5. Within these two members are disks arranged respectively on the inner and outer members. The mechanism for controlling the disks to apply the brake responsive to the axial movement of rod 17 can be either resilient means in the form of springs or fluid means. If fluid means are embodied, the air hose is coupled to the inner member along its axis in a manner which will permit the inner member to rotate relative to the air hose. The bleed for the air supply in both the clutch and brake is such that, when a piston within the brake unit moves toward the housing 5, the air escapes from the clutch to de-clutch the flywheel and the axial movement of the rod 17 toward the brake, when the clutch is applied, provides for escape of air from the brake to release the brake. If spring means are utilized, spring pressure tends to normally apply the brake means, which can be in the form of pivoted friction shoes or disks concentric of the shaft 13. The spring of course must be strong enough to provide the proper braking action and under these conditions the air pressure applied to the movable piston in the clutch must be sufficient to move the rod 17 a distance such as to release the spring pressure applied to the brake when the clutch is applied. Obviously the control for air pressure to clutch and brake or the clutch, if the brake is spring actuated, is from a separate source of supply of air and is controlled by the operator of the press in accordance with the working conditions. Obviously suitable feed mechanisms are provided to effect the proper feed of workpieces to the press in relation to the speed of the strokes of the respective slides and suitable means are provided for removing finished workpieces. If the press is operated at a slow rate, which is possible, the operator can manually remove a finished workpiece and insert a blank or a workpiece to be shaped while the slides are moving apart.

The hollow shaft 13 is journaled in four ball bearings 13a and has splined thereto, at a location within the substantial mid-point of the housing, a gear 18. This gear 18 meshes with and drives a gear 19 which in turn is keyed to a countershaft 21 which is journaled in bearings 20. This countershaft also carries thereon, and closely adjacent gear 19, an additional gear 22 which meshes with a gear 24, Figures 1 and 4, splined to intermediate shaft 23. This intermediate shaft 23 is journaled in two flange bearings 25, 26 secured to apertures in opposite sides of the housing 5, Figure 4. On this shaft 23 and adjacent opposite sides of the housing are splined or suitably fastened drive gears 27 which respectively mesh with a pair of gears 29 splined by a key and groove to a cross shaft 28. This latter shaft rotates in two flange bearings 30 and 31 also secured in aligned apertures in opposite sides of the housing 5. On the inner or facing side of the respective gears 29 is mounted, by means of screws 32, an eccentric disk 33. Each disk has two mounting bores 34 and 35 of different eccentricities, thereby making it possible to adjust for two different strokes of the tool slide 40, mentioned hereinafter, by changing from one mounting bore to the other. On each eccentric disk 33 runs a divided eccentric head 37 of a connecting rod 36, the parts of the head being fastened together by bolts 38. At the opposite ends of the respective connecting rods 36 is a tool slide 40 which by means of studs 39 is pivotally connected to the connecting rods. This slide 40, during its to and fro or reciprocatory motion, is guided by spaced hardened rails 41, Figures 4 and 5, which are connected by suitable screws to the press bed 42. The press bed 42 is attached by screws 43 to the adjacent end wall of the housing 5. The box-like portion 44 of press bed 42 that is located beneath the slide guide or way, constitutes a container for the cooling liquid for cooling the dies, which cooling is known in the art. The tool slide 40 carries a tool holder 46 which is adjustable lengthwise of the machine and which carries a punch 47 which is fastened to the tool holder by a cap nut 45. The axial adjustment in either direction of tool holder 46 and thereby punch 47 is effected by the rotation of nut 48 by means of a pair of bevel gears 49, from hand wheel 50. In other words the tool holder 46 is externally threaded so that rotation of internally threaded nut 48, which nut is restrained from axial movement, moves tool holder 46 and punch 47 back and forth relative to tool slide 40.

The drive shaft 28 carries adjacent one of the large gears 29 an additional gear 51 which drives gear 54 and shaft 55 carrying the same through an intermediate gear 53 which in turn is rotatable on pin 52, Fig. 1. Shaft 55 is journaled in journals 56. Rigidly connected to shaft 55 is a cam 57 and against which bears a roller 60 journaled on a pin 59 embodied in the forked control member 58, Figure 3. Both side portions or arms of the forked control member are slotted and these slots are instrumental in guiding a control or follower member 58 on guide elements 61 which are journaled on shaft 55. In these arms of the control member and above guide elements 61 are mounted a pair of spring packets 62 which on the one hand react against guide element 61 and on the other against the end of the forked control member 58 and thus effect forceful engagement between roller 60 and cam 57. In other words, these springs maintain the roller in contact with the cam. The springs 62 are guided on two guide rods 67. The latter are connected at one end by suitable screws to guide elements 61 and guided at the other end in tension boxes 63. By adjustment of the tensioning boxes 63 the spring tension may be regulated. In this manner the spring force acting through member 58 on the knee joint or joint pivot 64 can hold knee or toggle links 65a and 65b slightly folded from straight position at normal load in this position, but permit pivot 64 to swing out when the linkage is excessively loaded. Member 58 engaging pintle or joint 64 and moved by cam disk 57 in predetermined dependence upon the rotation of eccentric shaft 28 is connected with the tool slide 66 through links 65a and 65b. Studs 68 pivotally connect the respective links 65a to this slide to effect the drive thereof. The two arms or links 65a of the linkage bear, by means of a common hub, directly alongside the two eccentric disks 33 mounted on eccentric shaft 28. In this manner shaft 28 is mainly subjected to shearing stress. Tool slide 66 moves on the same hardened guide track 41 as does tool slide 40. A matrix 66a is mounted in slide 66. The press bed is fastened by anchoring bolts or screws 42a to a press foundation. It is believed clear therefore that the compact drive structure permits a dwell in the stroke of slide 66 while slide 40 is still moving toward the same. Furthermore with the compact arrangement of the drive mounted in the housing 5, it is entirely possible to utilize the same housing and drive relationship for a press in which the working stroke is on a vertical axis.

Figures 7, 8:
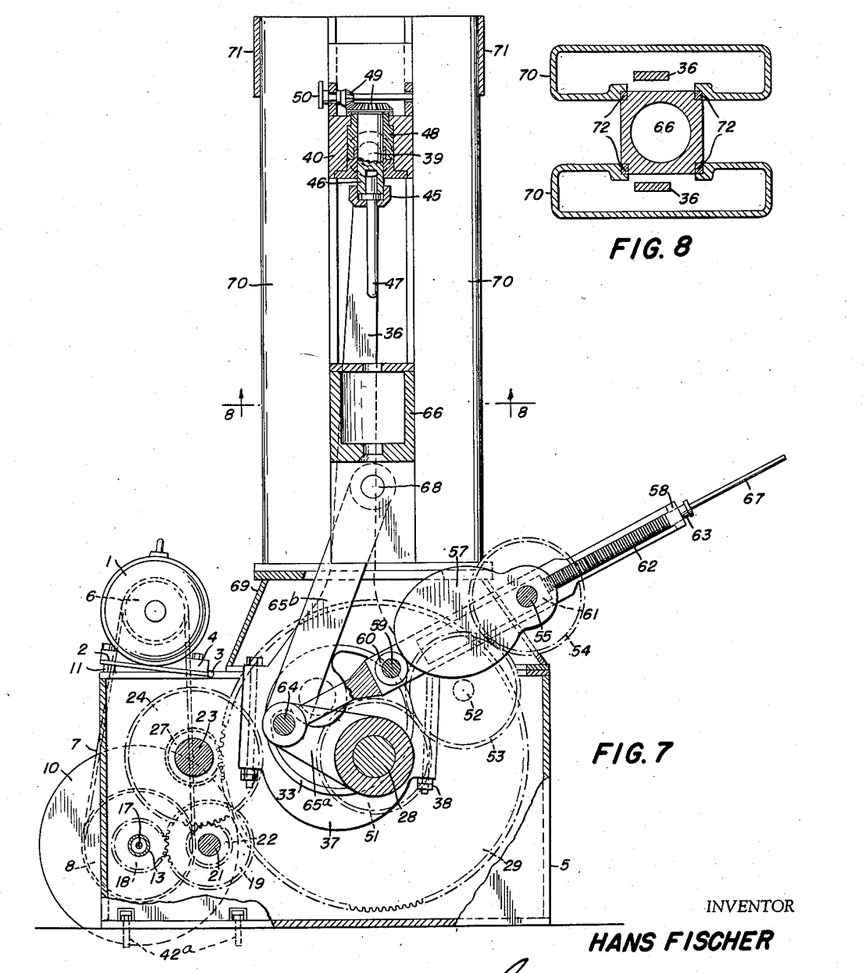
Figure 7 is a view of an upright press incorporating the same drive as in the foregoing figures and which view is a side elevational view partly in section.
Figure 8 is a horizontal sectional view taken on lines 8—8 of Figure 7 illustrating the standard and guides of the upright press.

Figures 7 and 8 illustrate a modification constituting an upright press. In this press the upper side or top of drive housing 5 has mounted thereon a conical extension piece 69 above which project two hollow standards 70. These standards are connected at their upper ends by two joining or cross plates 71. The guide for the tool slides 40 and 66 is effected by four hardened guide tracks 72, Figure 8, which are attached by suitable screws to the standards 70. The crank arms 36 are actuated in the space constituted by the hollow standards 70 as clear from Figure 8.

Figure 11:
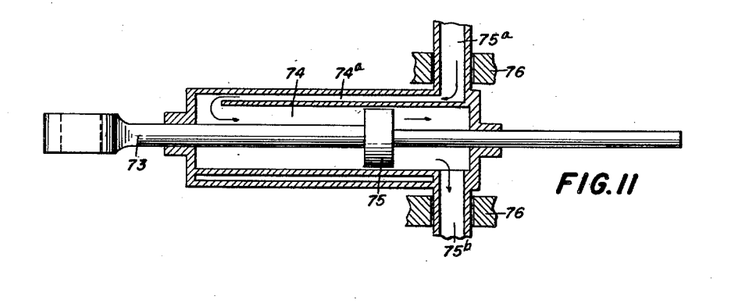
Figure 11 is a diagramatic representation on a slightly enlarged scale of the hydraulic cylinder and its piston embodied in the arrangement of Figures 9 and 10.
Figure 12:
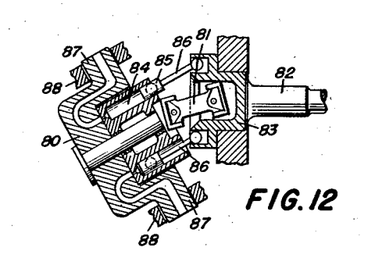
Figure 12 is a view partly in section and partly in elevation illustrating a rotary high pressure piston pump which in turn effects the operation of the hydraulic piston that controls the knee linkage.
Figure 13:
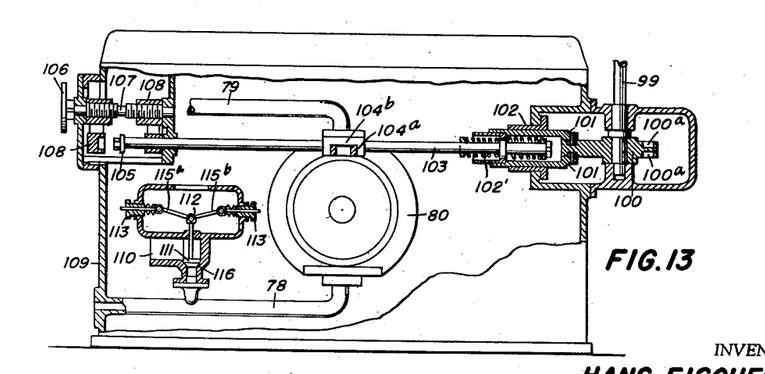
Figure 13 is a view taken along lines 13—13 of Figure 10, on an enlarged scale and partly in section.

In lieu of the mechanical drive for toggle linkage 65a and 65b, it is possible to effect the drive and the proper control of the stroke of the slide 66 by hydraulic means as illustrated in the modification disclosed in Figures 9, 9a, 10, 11, 12 and 13. To effect this hydraulic control the joint or stud 64 is engaged between two adjacent links 65a by the piston rod 73 that is movable in hydraulic cylinder 74. The piston 75 on rod 73, Figure 11, is subjected alternately to oil pressure on opposite sides. The hydraulic cylinder 74 is swingably mounted by means of two hollow trunnions 75a and 75b in journal 76, Figures 11 and 10. Cylinder 74 is of double wall construction so as to provide an annular space 74a providing communication between one face of piston 75 and hollow trunnion 75a and trunnion 75b provides communication with the opposite face of the piston. The two hollow trunnions 75a and 75b are connected for fluid flow in closed circuit with a rotary high pressure piston pump diagrammatically illustrated at 77 in Figures 9 and 10. This pump 77, see Figure 12, consists of a rotating cylinder body 80 which is driven through a pick-up 81 carried by the driving flange 83 of a shaft 82. Within the cylinder body 80 is provided an uneven number of cylinders 84 arranged concentrically around the rotational axis and pistons 85 operate in these cylinders. The pistons 85 are connected to driving flange 83 by piston rods 86 having spherical heads. The cylinder body 80 is provided with two trunnions 87 which can be swung about their axis in two bearings 88 and be moved to a position inclined with respect to the drive shaft 82. If the axis of driving shaft 82 and cylinder bores in the body 80 are in parallelism, no piston movement occurs and the pump does not deliver. If the body 80 is swung about trunnions 87 to reach a position that is oblique relative to the axis of drive shaft 82, then upon rotation of the latter and swinging of the body and according to the direction and magnitude of the swing angle, pistons 85 move alternately to and fro in the bores 84 of pump body 80. By placing body 80 in an oblique position the delivery efficiency of the pump can be gradually varied or varied without graduation and by swinging in different directions from the zero position the direction of pump delivery can be altered. The drive shaft 82 is driven by input shaft 13 through bevel gear pair 89, transverse shaft 90, another bevel gear pair 91 and thence stub shaft 92 that projects exteriorly of drive housing 5 through a clutch 93. The transverse shaft 90 is journaled on ball bearings on two journals 94 provided on the inner wall of housing 5.

On the eccentric shaft 28 is splined a gear 95. This gear drives cam disk 100 by means of gear 96, horizontal shaft 97, beveled gear pair 98 and vertical shaft 99 which carries the cam disk 100. Slots 100a are provided on both faces of the disk 100 and in these slots engage rollers 101 which are connected with a control member 103 through an elastic intermediate means 102. Control member 103 is pivotally connected by a bolt 104 journaled therein and screwed into the swingable body 80 of the pump and causes a swinging motion of the pump body 80 corresponding to the curved shape of disk 100.

Control member 103 carries at the end opposite cam disk 100 an abutment disk 105. This disk can move only between two limit stops 108 which are respectively adjustable through a hand wheel 106 and a right and left hand threaded screw spindle 107. With this construction the swing of control member 103 and thereby the swing of body 80 is limited. The springs 102' of elastic intermediate means 102 equalize the difference between control member motion afforded by disk 100 and the one due to adjustment of limit stops 108.

The pump is lodged in a closed housing 109 which at the same time serves as a reservoir for the pressure oil. In the housing 109 an oil conduit 78 is located and which communicates with trunnion 75a and is provided with a safety overflow valve 110. The oil pressure acts on valve cone 111, which is held closed by knee or toggle joint 112. By tensioning boxes 113, springs 114 are tensioned against knee links 115a, 115b so that the force exerted against the knee joint causes the closing pressure between valve cone 111 and valve seat 116. After reaching this position the knee links 115a, 115b stay closed until back pressure and the springs 114 swing them to the side opposite to valve cone 111 to open the valve completely and hold it open so that the oil can flow freely into housing 109 until the operator pushes the linkage down by a push rod, not shown, that passes through the housing 109 and the valve housing.

Figure 9:
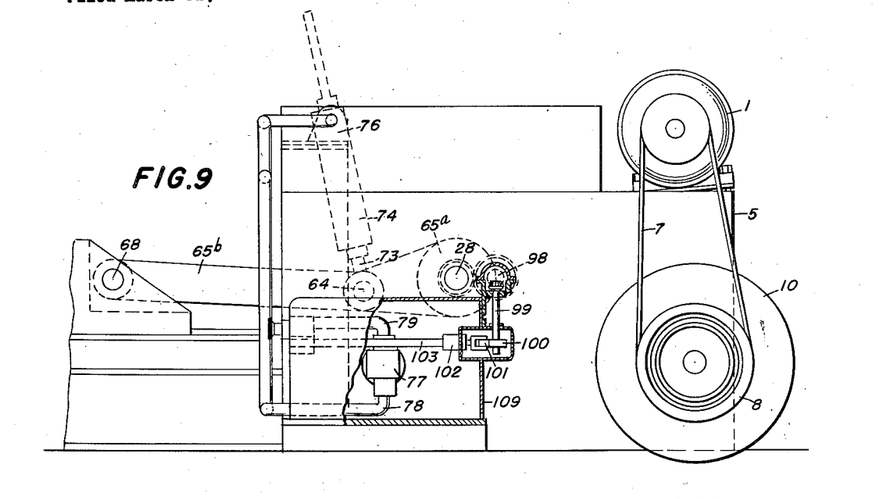
Figure 9 is a fragmentary view partly in elevation with certain parts in section illustrating the modification embodying a hydraulic drive and control for actuating the knee links or linkage for one of the slides.
Figure 9A:
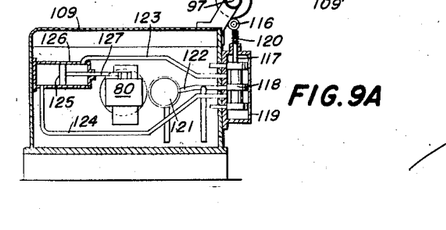
Figure 9a illustrates partly in section and partly in elevation a hydraulic servomotor control for effecting swinging motion of a rotary high pressure piston pump and which motion in turn controls the linkage for one of the tool slides.
Figure 10:
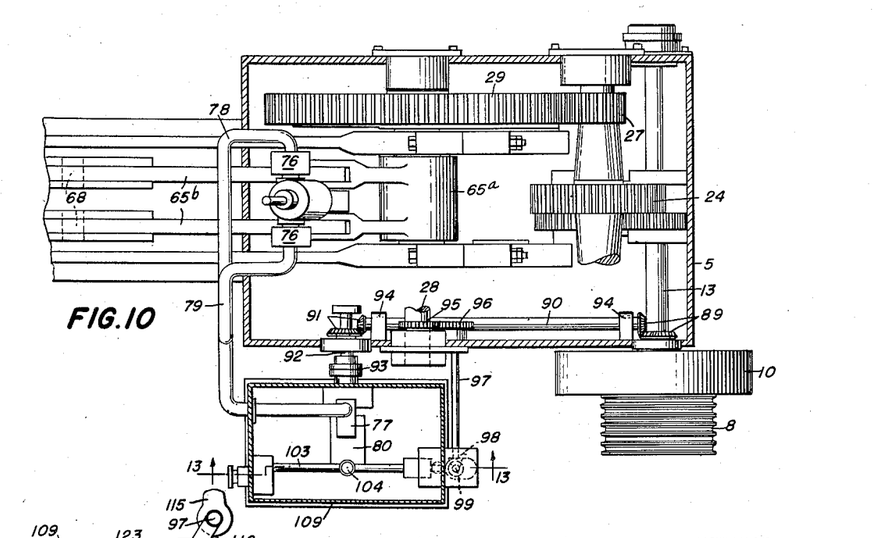
Figure 10 illustrates a hydraulic drive and control device and constitutes a plan view with parts in section of the modification disclosed in Figure 9.

If the swing motion of body 80 is not to take place mechanically, but according to Figure 9a hydraulically, then a cam disk 115 is driven through shaft 28, driving gears 95 and 96 and shaft 97 and which cam disk actuates piston 118 of control cylinder 119 through roller 116 and piston rod 117. A spring 120 insures engagement between roller 116 and disk 115. According to the position of piston 118 in control cylinder 119 the pressure oil delivered by auxiliary pump 121 and conducted to a control cylinder 119 through conduit 122 can be supplied alternately to the opposite sides of control piston 125 mounted in cylinder 126. Piston rod 127 connected to piston 125 is at its free end connected to pump body 80 and transmits the movement of piston 125 to the pump body 80 to move the same to and fro similar to the movement of body 80 by rod 103.

In connection with the swinging motion of the pump body 80, the bolt or pin 104 is surrounded by a link block 104a which can move in a slot formed in a block member 104b carried by control rod 103. In other words, as the control rod 103 reciprocates responsive to the actuation of the disk 100, the connection between the block member and the stud or bolt 104 oscillates or rocks the pump about a vertical axis perpendicular to the shaft 82. Thus in Figure 12, which is a sectional view through the pump body and a drive shaft, it is pointed out that the section through the body 80 is displaced 90° with respect to its proper operating position. This is in order to illustrate the channels through the pump body to the trunnions 87.

With respect to the drive for the slides, I want to expressly point out that the details of construction shown in Figure 4, including broadly the control for the toggle linkage to cause the dwell in the stroke, provide an extremely balanced drive for the oppositely reciprocating slides which permit a substantial reduction in total press weight. The crank drives for slide 40 being located on opposite sides of the path of movement of the slide and the toggle drive for slide 66 being located between the respective crank drives establish oppositely acting forces resulting in mainly shear stresses being applied to shaft 28 during the working stroke. Thus, the force resulting from the toggle linkage is to the left as viewed in Figure 4 and through the hub of the toggle links 65a pushes on the shaft 28 while oppositely acting forces are established through the connecting rod and eccentric mounting of the drive for slide 40 that tend to exert a pull force to the right, thereby balancing the forces and resulting in the stress that is mainly shear on the shaft 28 on opposite sides of the hub of the toggle linkage.

In connection with the drive for the punch slide, while I have illustrated means for obtaining an adjustable stroke by the provision of the double bores 34, 35 in the eccentric disk 33, I further wish to point out that the adjustability of the stroke can be obtained by mounting an adjustable eccentric arrangement, which as shown in Figures 16 to 22 includes an inner and an outer member both of which have eccentric bores, with the outer member 130 mounted on the inner member 131 and two such eccentric arrangements mounted on shaft 28 on opposite sides of the hubs for the toggle links 65a, in lieu of the eccentric disk 33 and gear 29. The outer member is connected for rotation with the shaft 28 by an annular jaw coupling 132 surrounding the shaft and including teeth on the outer eccentric 130 and cooperating teeth on annular element 133 that is pinned to shaft 28 and by a rod 134 that passes transversely through the shaft. A slot 135 passes transversely through the shaft 28 and accommodates the rod. This slot is longer in axial relation of the shaft than the thickness of the rod, Figure 22, and the shaft is further bored axially thereof from its free end inwardly to a point adjacent the inner eccentric member, as shown at 136. Mechanism including an axially extending rod 137 is mounted within this axial bore and connected to the transversely extending rod for withdrawing the rod and thereby the movable jaw away from the other jaw which is provided on the outer eccentric member. The connecting rod halves are mounted around the outer eccentric member and in this arrangement a gear 29' is journaled at each end of shaft 28 although the gear is connected for rotation with the shaft since it is coupled to the inner eccentric. Thus to vary the stroke the press is stopped and with shaft 28 stationary each axially movable jaw moves outwardly to release the jaw coupling whereupon the outer eccentric member 130 is turned manually by applying a turning force to the pin 130'. Following rotation of the outer eccentric relative to the inner eccentric to vary the eccentricities, the jaw coupling is reapplied to couple the eccentrics for rotation together and with the shaft 28 to thereby impart a different length of stroke to the punch slide. This adjustable feature is important because it permits variation of not only the capacity of the press but also of the type of work to be performed. The means for releasing the coupling at both ends of shaft 28 include the provision of external threads 138 on the axially extending rod 137 through which transverse rod 134 passes and an internally threaded nut 139 at each outer end of shaft 28. Thus the nut provides a rotatable adjustment member and is restrained against axial movement relative to shaft 28 by means of a flanged collar 140 mounted on the end of shaft 28 by suitable bolt or screw connections 141. It follows that rotation of the nut will move rod 137 axially toward or away from the center of shaft 28 depending upon the direction of rotation of the nut to produce axial movement of the movable jaw members.

Further I wish to point out that while an adjustable eccentric and a connecting rod drive are illustrated, a modified form of the drive will constitute a cranked drive instead of an eccentric drive. This cranked drive will incorporate stub shafts extending inwardly from each side of housing 5 and respectively mounting the gears 29. A single cranked shaft with the crank loop in the central portion thereof will have its opposite ends fastened to the facing sides of the respective gears 29. The connecting rods for slide 40 will be mounted on the aligned portions of this shaft adjacent each gear 29 and the hub for toggle links 65a will be mounted on the crank loop.

It is therefore believed clear that with the compact drive arrangement including the toggle mechanism for one slide and either a crank or eccentric drive for the other, including components mounted on opposite sides of the toggle drive, I have provided a press in which the torque imparted by the drive can be utilized to perform different types of work, whether the work requires a short stroke and a high application of force or a long stroke with less application of force. In other words, the specific arrangement of Figure 4 is ideally suited for this dual function. However, for extremely high forces the adjustable eccentric drive mentioned above as a modification which again uses the same common transverse drive shaft 28 is expressly suitable.

The above described presses operate in the following manner:

The tool slides are respectively driven by a crank drive and a toggle linkage drive. The crank can be an eccentric disk on a shaft with a connecting rod coupled to the slide or a crank shaft and connecting rod. In Figures 1 to 15 the slides are actuated as follows:

The crank drive including eccentrics 33 and connecting rods 36 move slide 40, and toggle linkage 65a, 65b moves slide 66. Eccentric 33 rotates with shaft 28 at uniform angular speed. The toggle links 65a, 65b are actuated by the control member 58 engaging and moving the toggle pivot stud 64 or by engagement therewith of piston rod 73 under control of the cam disks 57 or 100 or 115 respectively. This control is effected in such a manner that the respective positions of the two tool slides during a complete press operation, as illustrated in Figure 14 for continued drawing of a hollow body, is precisely determined.

Figure 14:
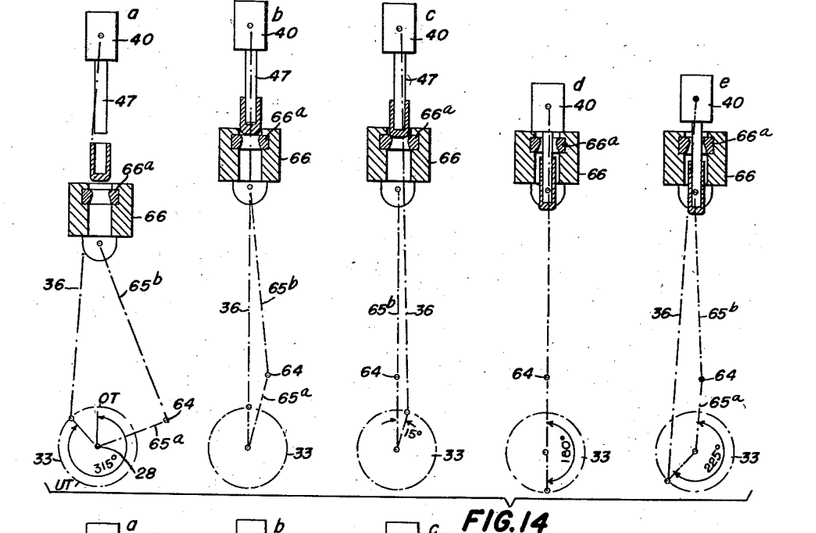
Figure 14 illustrates diagrammatically the different working positions of the tools with respect to one another during a drawing operation, Figure 15 diagrammatically illustrates the different working positions of the tools of the press during complete pressing movement when effecting inverse extrusion.

In position a of Figure 14 the tool slide 40 with punch 47 is in a position which corresponds to the position of eccentric 33 when it is 45° in front of OT, upper dead center. Tool slide 66, carrying matrix 66a, is simultaneously in its terminal or end position remote from tool slide 40 with the toggle links 65a, 65b in the position including their minimum angle. In this position of both slides the workpiece to be shaped is inserted between the tools 47, 66a. In position b the tool slide 40 has moved up since the crank drive is in the upper dead center position OT. The other tool slide 66 has simultaneously moved toward slide 40 due to the swing of toggle links 65a, 65b toward straightened or aligned disposition. In position C, slide 40 has reached a position which corresponds to that position of eccentric 33, when it is 15° behind OT. At this moment slide 66 has reached its terminal or end position near slide 40 with the toggle links in aligned or substantially aligned disposition. The workpiece to be shaped is now engaged by both the punch 47 and matrix 66a and the shaping proper begins with slide 66 held stationary. In position d slide 40 has reached its terminal or end position near slide 66 and which end position corresponds to the position of the eccentric 180° behind OT, namely at UT, that is lower dead center. The shaping of the workpiece is finished. In position e, slide 40 has started to withdraw since the eccentric has moved past UT and has now reached a position when it is 225° behind OT, top dead center. In this position slide 66 starts its motion away from slide 40. Just prior to this instant the release of the workpiece from punch 47 has commenced. Now the two slides 40, 66 move in the direction toward the starting position shown in position a, that is away from each other, and the press operation in the mentioned sense starts anew after having removed the shaped piece and insertion of a next piece to be shaped.

Figure 15:
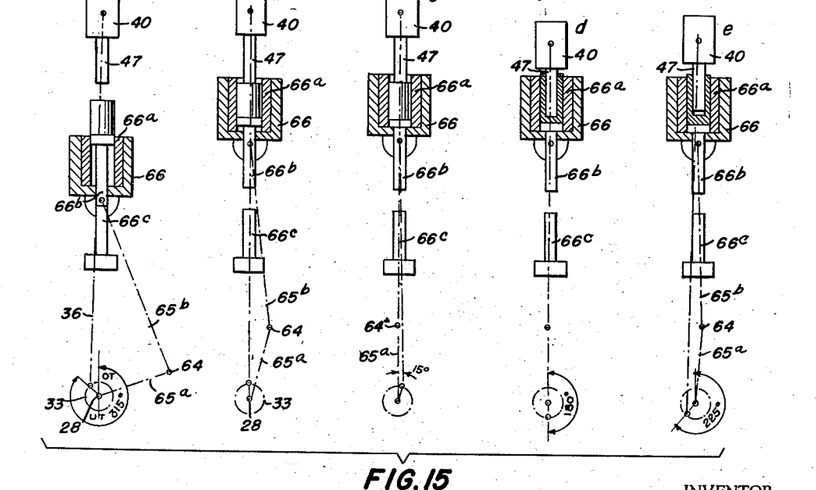
Figure 16:
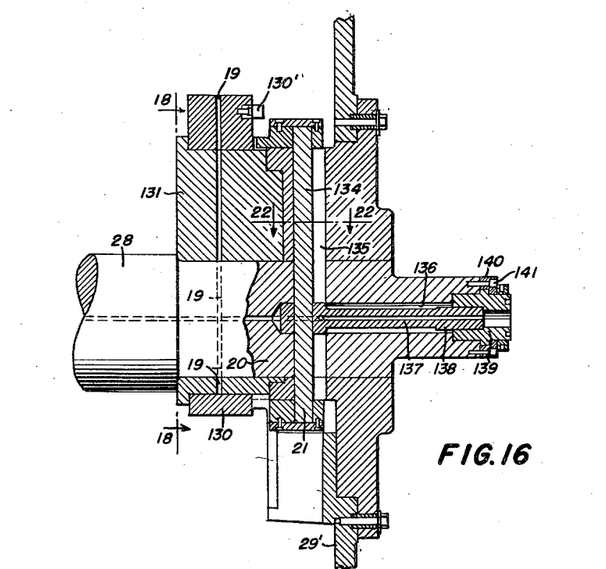
Figure 16 is a view partly in longitudinal section and partly in elevation and illustrating an adjustable eccentric device for obtaining an adjustable stroke of the punch slide.
Figure 17:
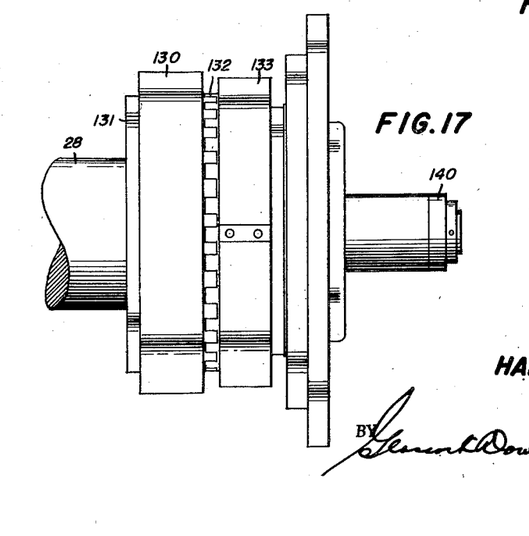
Figure 17 is a fragmentary side elevational view illustrating the parts shown in Figure 16, Figures 18 to 21 are transverse sectional views taken on lines 18—18, 19—19, 20—20 and 21—21, respectively, of Figure 16.
Figure 18:
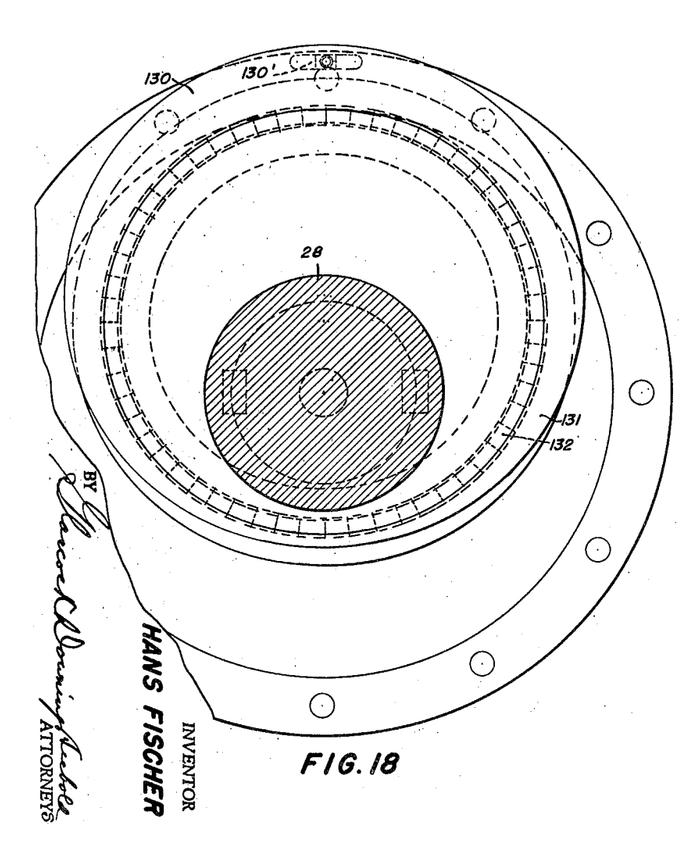
Figure 19:
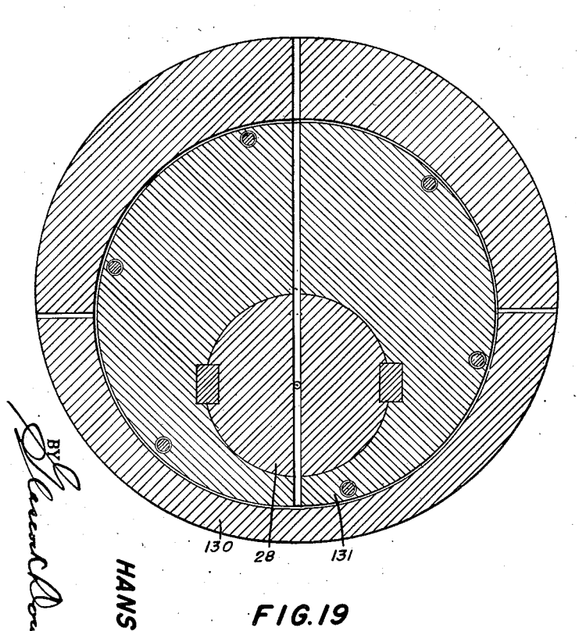
Figure 20:
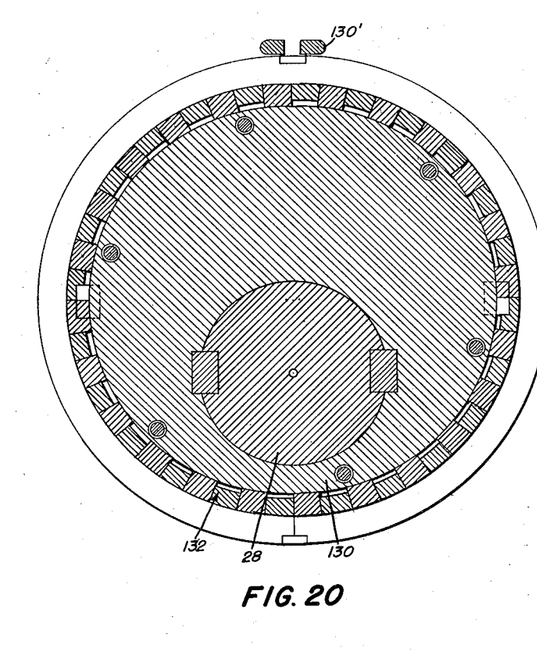
Figure 21:
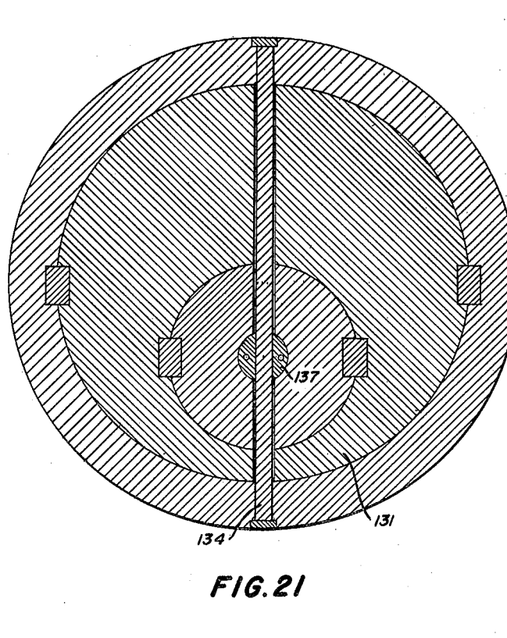
Figure 22:
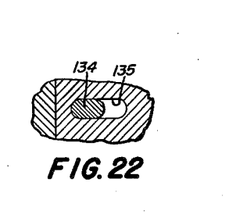
Figure 22 is a fragmentary sectional view taken on lines 22—22 of Figure 16 and illustrating the slot and cross-rod connection for the jaw coupling.

In Figure 15, the novel working method of the press is illustrated for inverse extrusion of a hollow body from a slug and illustrates the same positions of the two slides as shown in Figure 14. The tools in inverse extrusion comprise punch 47, matrix 66a, counterpunch 66b and the expeller or knockout 66c mounted on press bed 42.

The operation of a press according to the above described method and press for shaping metals in comparison with the hitherto known method offers the following advantages:

1. It can be applied to presses which require a substantially lower torque for driving the punch slide;
2. The bed or standard of the press is not subjected to any operating forces active during shaping of the workpiece in the axis of the tools. These working forces are transmitted by the tool slides through the driving elements upon the eccenter or cross shaft 28 in such a manner that the same is mainly subjected to a shearing stress so that its dimensions may be relatively small;
3. Owing to the favorable connecting rod or crank drive relation for one of the slides and the straightened disposition of the knee or toggle links for the other slide during the shaping operation, the forces perpendicular to the tool axis on the bed or standard of the press are very small whereby the precision of the press is increased. This is also true when the knee links are in only a slightly diverging position, which is the case, if the knee joint 64 is engaged by a device insuring against overload, such as the yielding features of control members 58 or 73 respectively; and
4. The efficiency of the press, that is the number of pieces shaped per unit of time, is increased without increasing the speed of shaping.

It will also be evident that various other forms embodying substitutions, eliminations, additions and combinations may be resorted to without departing from the broad spirit and scope of the appended claims and hence I do not wish to limit myself in all respects to the exact and specific disclosures of the selected examples of press drive arrangements.

What I claim is:

1. In a press for shaping metal and in combination a pair of oppositely movable reciprocatory slides, a metal working tool carried by one slide, a matrix carried by the other slide, drive means for reciprocating the slides including means for moving the slides toward and away from one another to engage a work piece therebetween for shaping the same, control means operative to position and hold one slide stationary while the drive means continues the shaping operation and to thereafter cause the slides to move away from one another to facilitate release of a shaped work piece, said drive means including a drive shaft, a crank means driven thereby, a connecting rod connected between the crank means and one slide, a linkage means operatively connected between the shaft and the other slide and including one link pivotally connected to said other slide, another link rotatable on said shaft and a joint pivotally connecting the links, and said control means including a cam, means for rotating the same in synchronism with said shaft, a control member connected with said joint and carrying a roller, said roller engaging said cam to control the linkage in accordance with the contour of the cam so as to effect a dwell in the stroke of the slide driven by said linkage.

2. In a press as claimed in claim 1, and spring means for restoring the linkage to straightened position.

3. In a press as claimed in claim 2, and means for adjusting the tension of said spring means including an adjustable nut operative to adjust the tension in such a manner that the spring force acting on the joint of the linkage holds the links in a position at least only slightly deviated from a straightened position at normal press loads and said spring means permitting further movement of the links on an overload.

4. In a metal press, a combination including a slideway, oppositely reciprocating slides thereon, drive means for reciprocating the slides toward and away from one another including a drive shaft extending perpendicular to the path of movement of the slides, a pair of crank drives operatively connected between the shaft and one slide and mounted in axial spaced relation on the shaft, a toggle drive for the other slide including linkage means pivotally connected to said other slide and rotatably journaled on said shaft between the crank drives and further including a joint between the linkage means connecting the same together, and means for applying force to said joint in a direction transverse to the axis of the drive shaft for moving the linkage means of the toggle linkage to reciprocate the associated slide toward and away from the other slide.

5. In a metal press, a combination including a slideway, oppositely reciprocating slides thereon, drive means for reciprocating the slides toward and away from one another including a drive shaft extending perpendicular to the path of movement of the slides, said drive shaft being perpendicular to and crossing the axis of the path of the slides, a pair of crank drives operatively connected between the shaft and one slide and mounted in axial spaced relation on the shaft, a toggle drive for the other slide including linkage means pivotally connected to said other slide and rotatably journaled on said shaft between the crank drives and further including a joint between the linkage means connecting the same together, and means for applying force to said joint in a direction transverse to the axis of the drive shaft for moving the linkage means of the toggle linkage to reciprocate the associated slide toward and away from the other slide.

6. In a metal press as defined in and by claim 5, and in which the toggle linkage and the means for moving the same impart a single stroke movement to the linkage and further include means for holding the slide associated with the toggle linkage stationary at its position of maximum approach toward the other slide while the first mentioned slide continues its movement toward the shaft.

7. In a metal press as defined in and by claim 6, in which the means for holding the toggle linkage stationary includes a cam and a follower and said follower being connected to the said joint.

8. In a metal press as defined in and by claim 5, in which the toggle linkage and the means for moving the same impart a single stroke movement to the linkage, said means for applying force to said joint including hydraulically actuated means for holding the slide associated with the toggle linkage stationary at its position of maximum approach toward the other slide while the first mentioned slide continues its movement toward the shaft.

9. In a metal press as defined in and by claim 5 in which the toggle linkage and the means for moving the same impart a single stroke movement to the linkage, said means for applying force to said joint including hydraulically actuated means for holding the slide associated with the toggle linkage stationary at its position of maximum approach toward the other slide while the first mentioned slide continues its movement toward the shaft, and said hydraulically actuated means including a piston having a rod engaging the joint of said linkage, a cylinder means within which said piston is movable, means for pivotally mounting said cylinder means including two hollow trunnions through which pressure fluid can flow and means for leading the flow from said trunnions to opposite sides of the piston.

10. In a press, a slideway, oppositely moving slides thereon, a punch carried by one slide, a matrix carried by the other slide, a shaft extending transversely of the slideway, adjacent one end thereof and crossing the axis of the punch, drive means for one slide including axially spaced means on the shaft and toggle drive means for the other slide including components mounted on the shaft between the said axially spaced means.

11. In a press as defined in and by claim 10 in which the drive means for the said one slide includes a pair of connecting rods pivotally connected to the said slide at one end and journaled on said axially spaced means at the opposite ends, said last mentioned means comprising eccentric means.

12. In a press as defined in and by claim 11 and in which the eccentric means are adjustable relative to the shaft to vary the eccentricity thereof and thus the stroke of the said one slide.

13. In a press as defined in and by claim 12, in which the eccentric means includes an inner eccentric fastened to the shaft, an outer eccentric surrounding the inner eccentric, said connecting rods being connected to the outer eccentric, and coupling means for releasably coupling the outer eccentric for rotation with the shaft.

14. In a press as defined in and by claim 13, in which the coupling means includes a jaw coupling including a fixed jaw carried on the outer eccentric, a movable jaw carried by the shaft and movable axially thereof, and means for moving said jaw axially of the shaft to couple or uncouple said outer eccentric relative to said shaft.

15. A press for shaping metal in which tools comprising a common guide, a plunger and a matrix mounted on said common guide for sliding movement toward and away from each other, eccentric and connecting rod means for driving one of said tools, toggle link means for driving the other tool, a common shaft extending transversely of the direction of sliding movement of the tools, spaced end bearings for said shaft, and said connecting rod and said toggle link means each being supported at one end by said common shaft and being disposed closely adjacent to one another between said two spaced end bearings.

References Cited in the file of this patent

UNITED STATES PATENTS

| | | |
|---|---|---|
| 1,849,027 | Pardee | Mar. 8, 1932 |
| 2,128,705 | Hatebur | Aug. 30, 1938 |
| 2,232,889 | Spencer | Feb. 25, 1941 |
| 2,522,451 | Johansen | Sept. 12, 1950 |
| 2,560,250 | Roucka et al. | July 10, 1951 |

FOREIGN PATENTS

| | | |
|---|---|---|
| 484,078 | Germany | Oct. 11, 1929 |
| 545,186 | Germany | Mar. 3, 1932 |
| 556,835 | Germany | Aug. 15, 1932 |